United States Patent
Hiraki et al.

(10) Patent No.: US 9,792,934 B2
(45) Date of Patent: Oct. 17, 2017

(54) MULTI READER HEAD HAVING A VARYING GAP LAYER LAMINATED BETWEEN READERS

(71) Applicant: TDK Corporation, Tokyo (JP)

(72) Inventors: Tetsuya Hiraki, Tokyo (JP); Minoru Ota, Tokyo (JP); Hisayoshi Watanabe, Tokyo (JP); Kenzo Makino, Tokyo (JP); Hideyuki Ukita, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 15/059,383

(22) Filed: Mar. 3, 2016

(65) Prior Publication Data

US 2017/0256276 A1    Sep. 7, 2017

(51) Int. Cl.
*G11B 5/39* (2006.01)
*G11B 5/11* (2006.01)

(52) U.S. Cl.
CPC ............ *G11B 5/3912* (2013.01); *G11B 5/112* (2013.01); *G11B 5/3951* (2013.01); *G11B 5/3909* (2013.01)

(58) Field of Classification Search
None
See application file for complete search history.

(56) References Cited

U.S. PATENT DOCUMENTS

| | | | |
|---|---|---|---|
| 6,819,530 B2 | 11/2004 | Gill | |
| 8,472,146 B2 | 6/2013 | Brown et al. | |
| 2003/0011939 A1 | 1/2003 | Gill | |
| 2011/0216432 A1 | 9/2011 | Yanagisawa | |
| 2011/0232079 A1* | 9/2011 | Miyauchi et al. ... | G11B 5/3912 29/603.07 |

* cited by examiner

*Primary Examiner* — Craig A. Renner
(74) *Attorney, Agent, or Firm* — Posz Law Group, PLC

(57) ABSTRACT

A multi reader head has a plurality of readers that are laminated via a gap layer(s), and each of the readers has a structure in which a current-perpendicular-to-plane (CPP) type of magneto-resistive effect element, where a current flows along the lamination direction, is interposed between a pair of shields that function as an electrode, respectively, from both sides in the lamination direction. The shields that are opposed from each other via the gap layer of the readers that are adjacent in the lamination direction by a distance that is not constant, but include a portion with a greater distance between the shields and another portion with a smaller distance between the shields are included. The portion with a greater distance between the shields is situated at a position away from the center on an air bearing surface opposing to a recording medium in the magneto-resistive effect element.

18 Claims, 31 Drawing Sheets

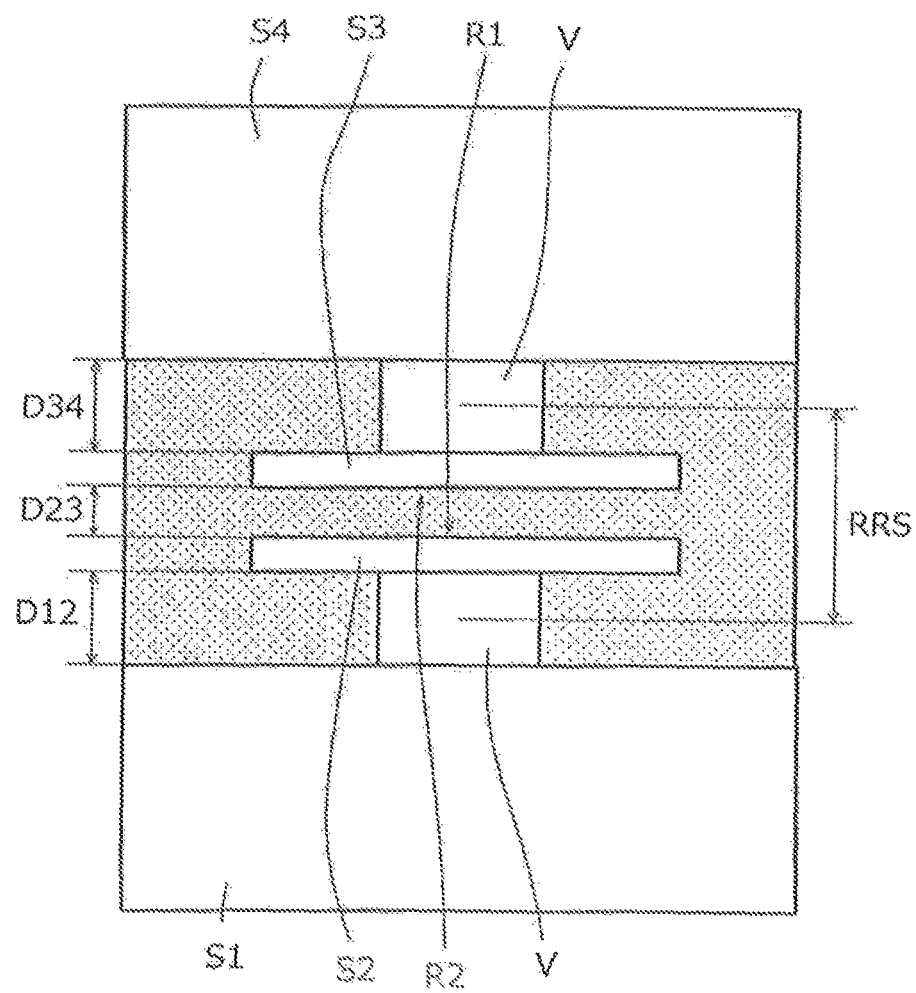

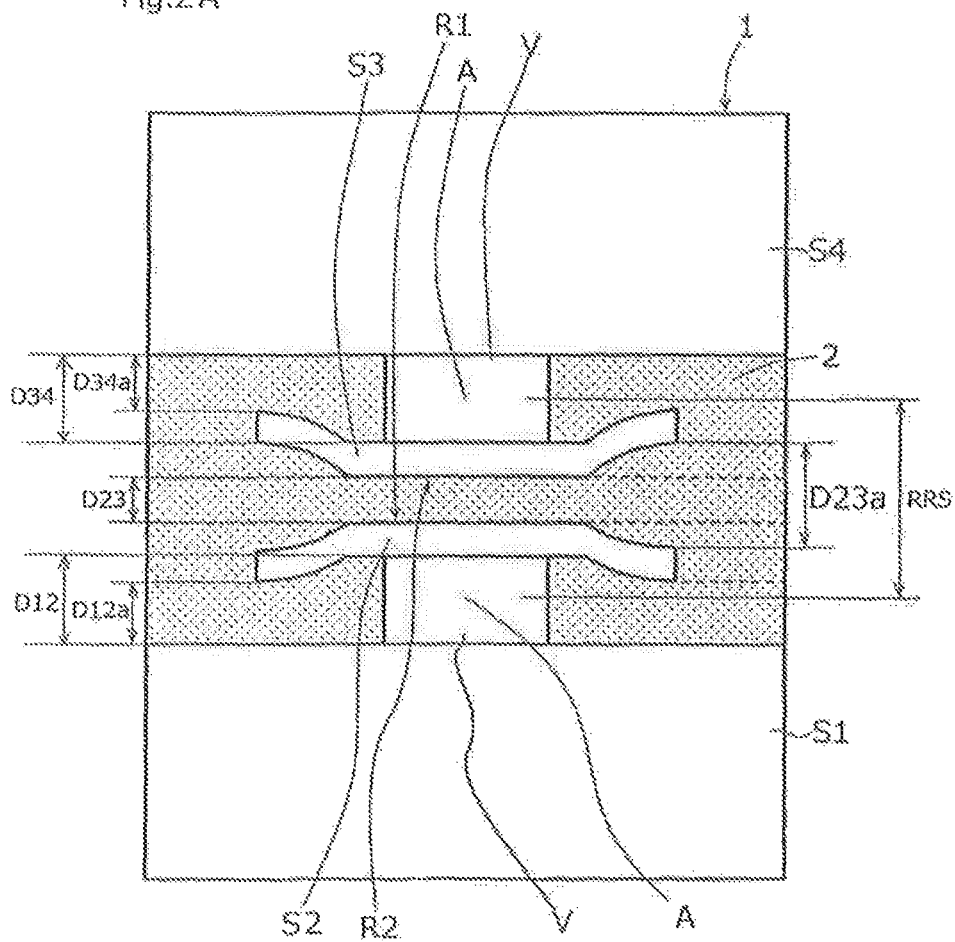

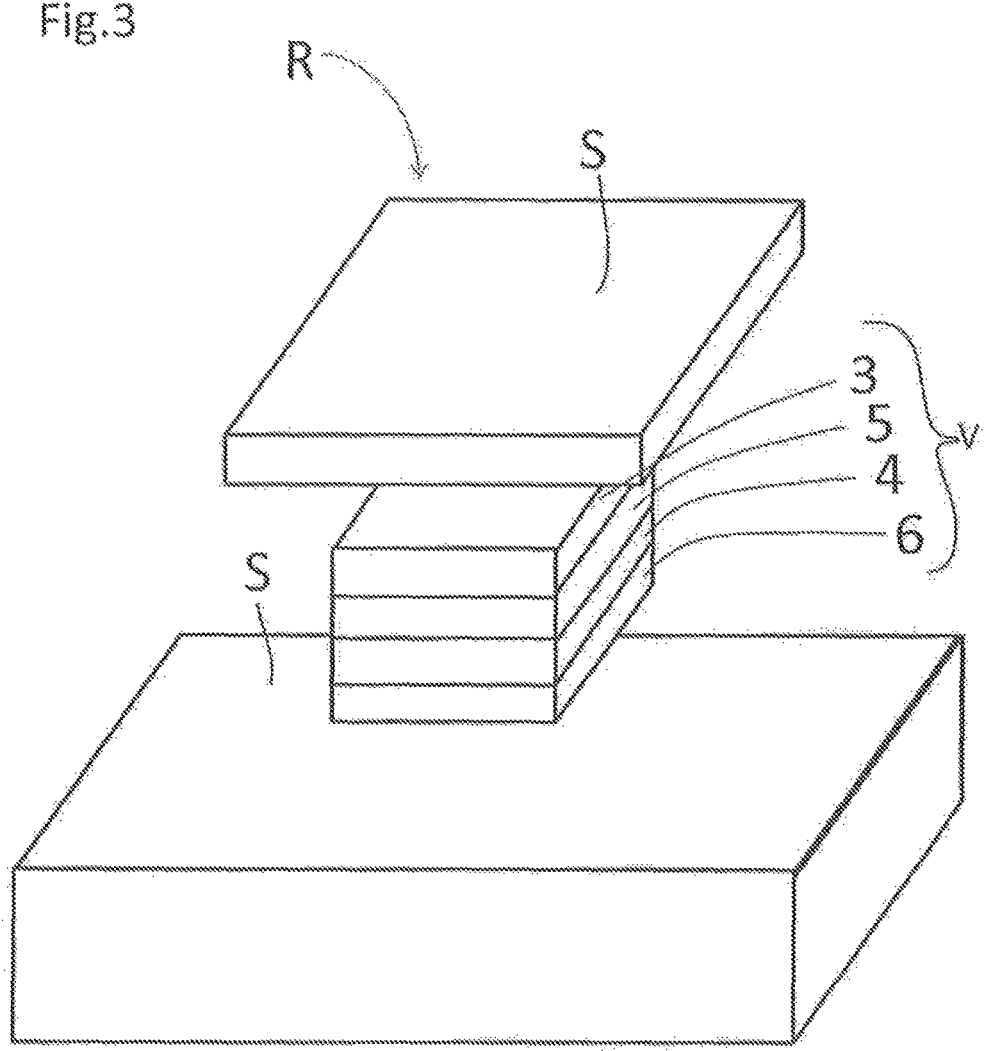

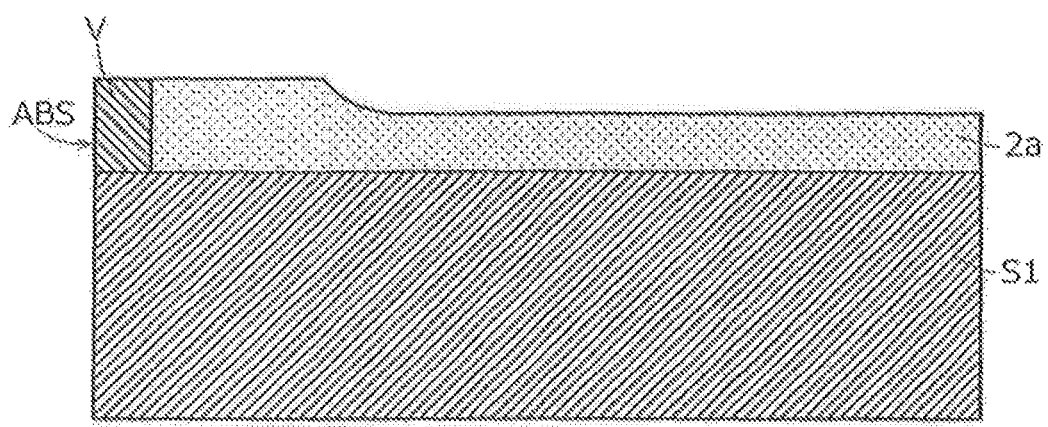

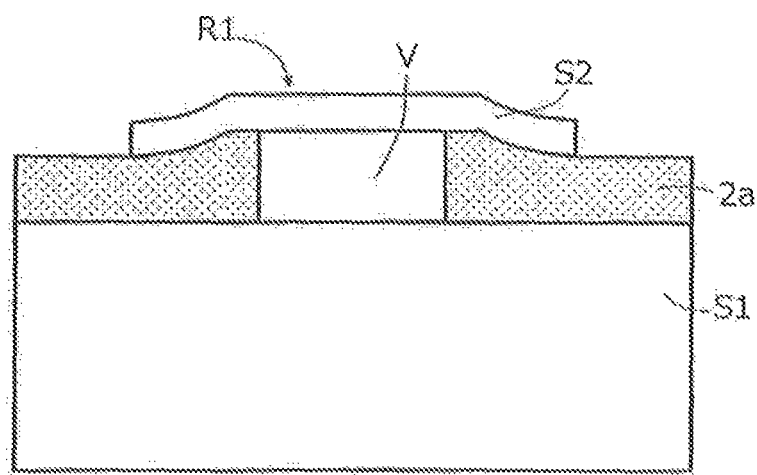

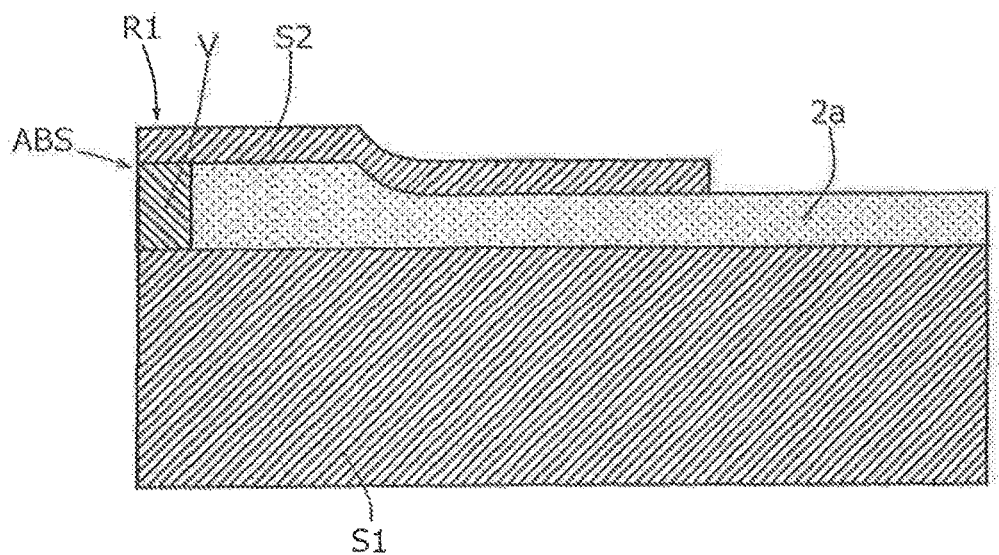

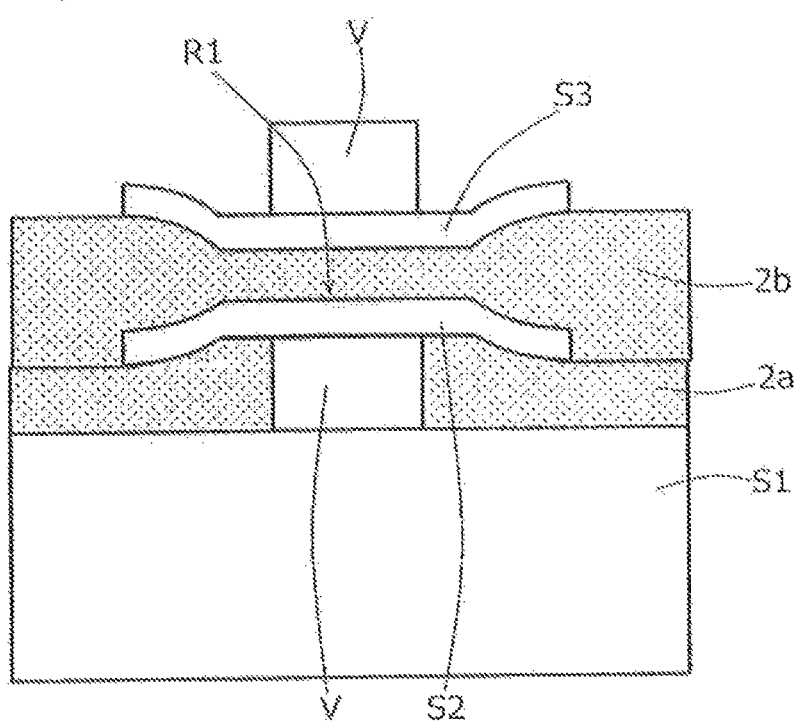

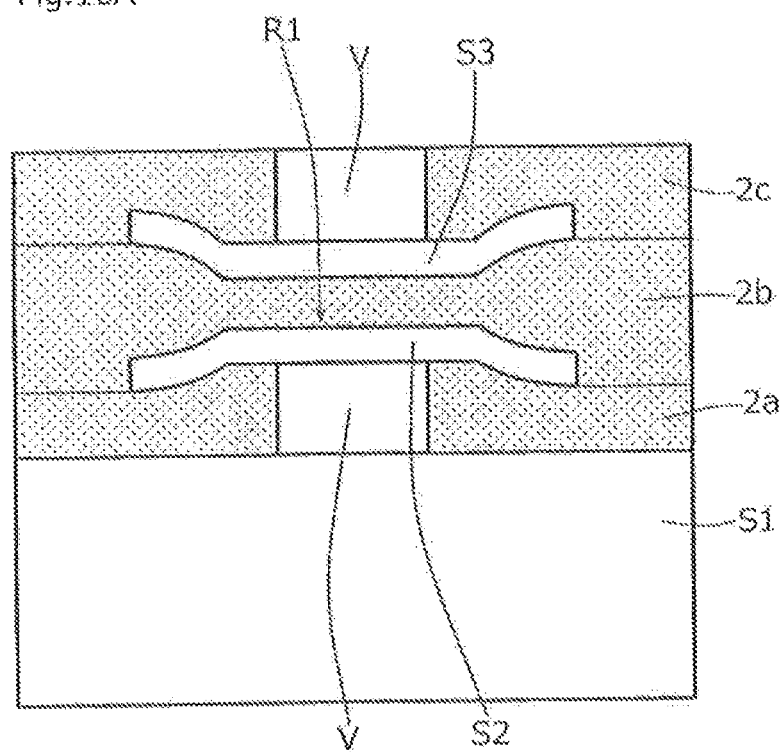

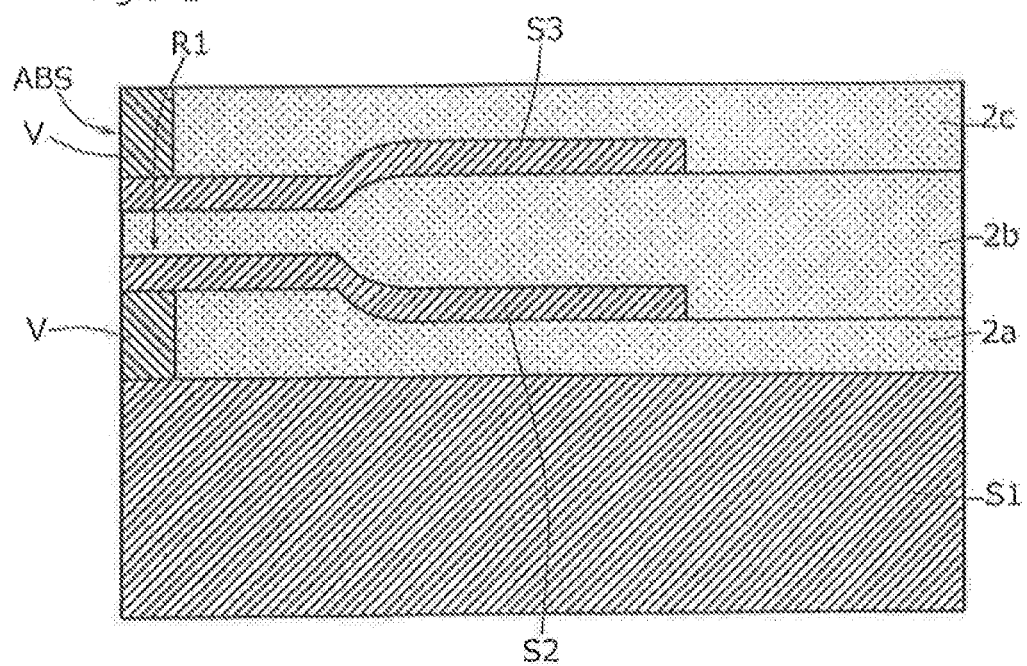

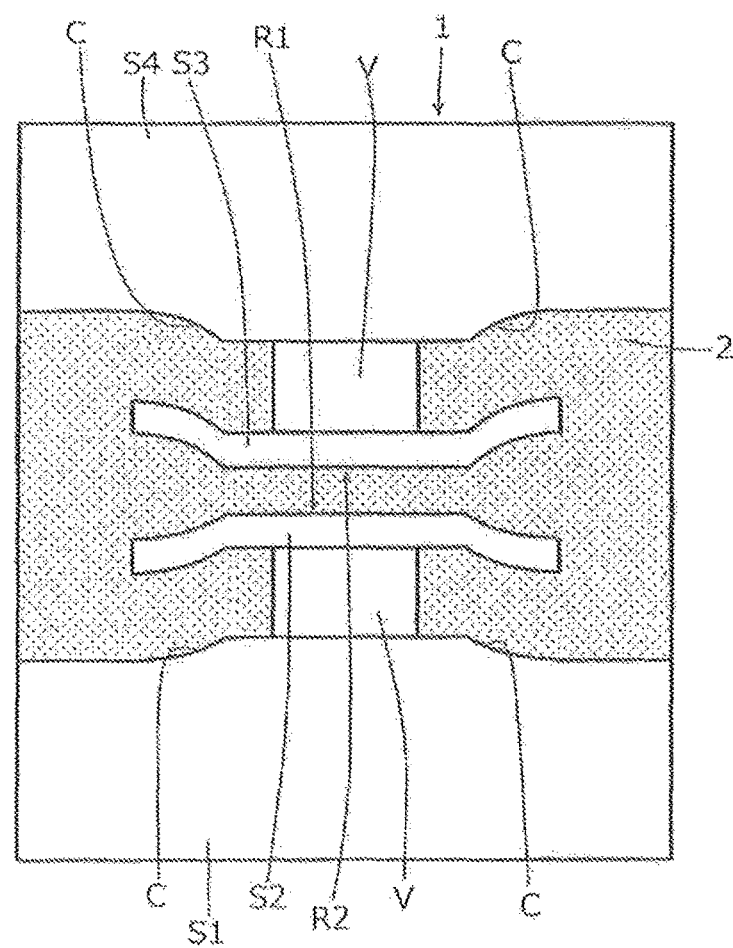

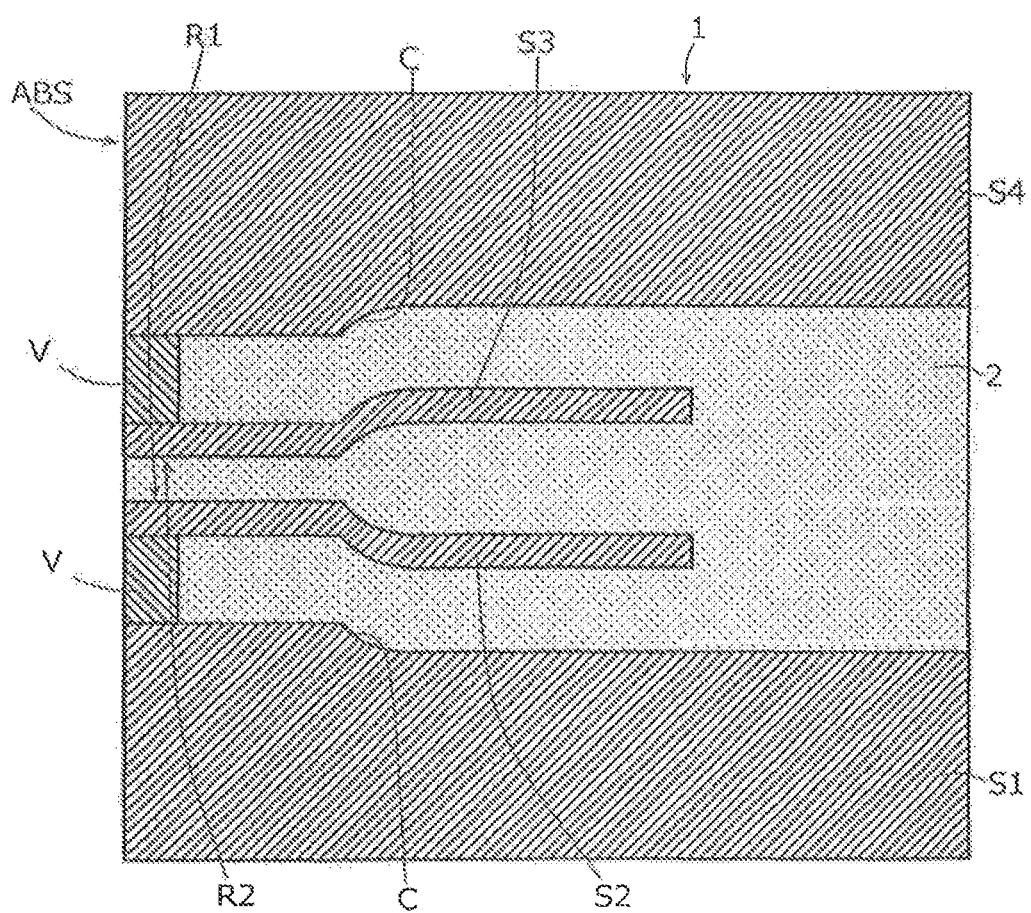

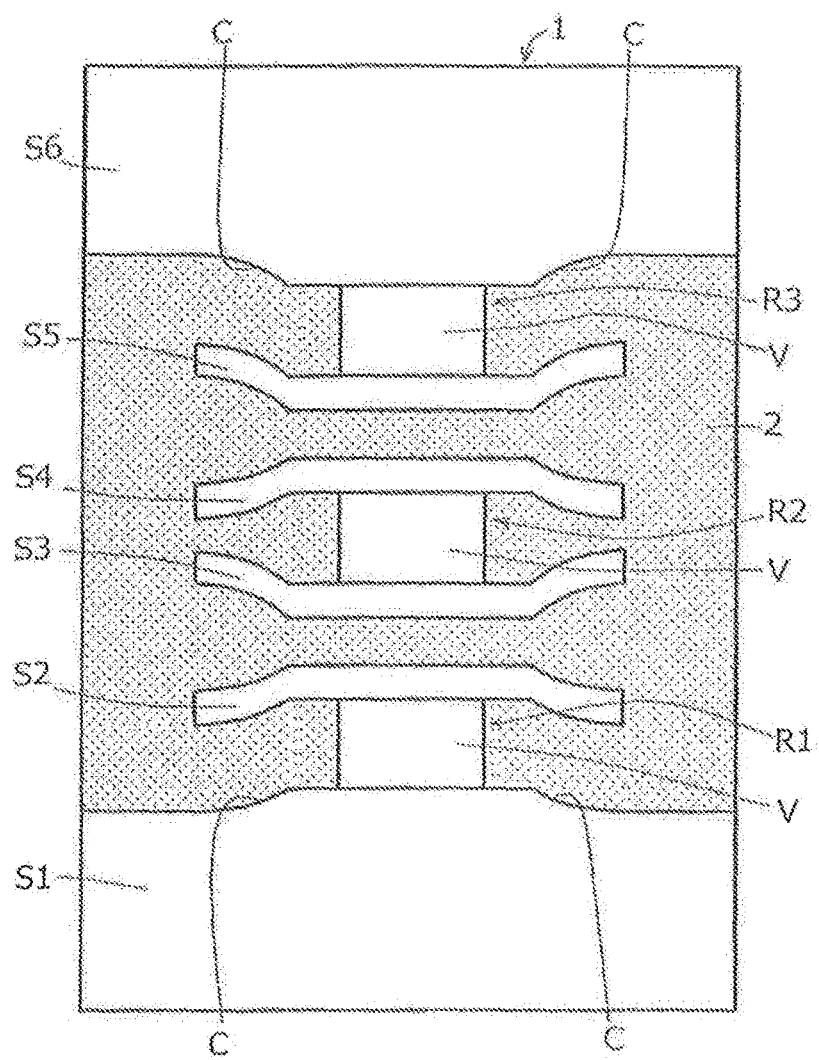

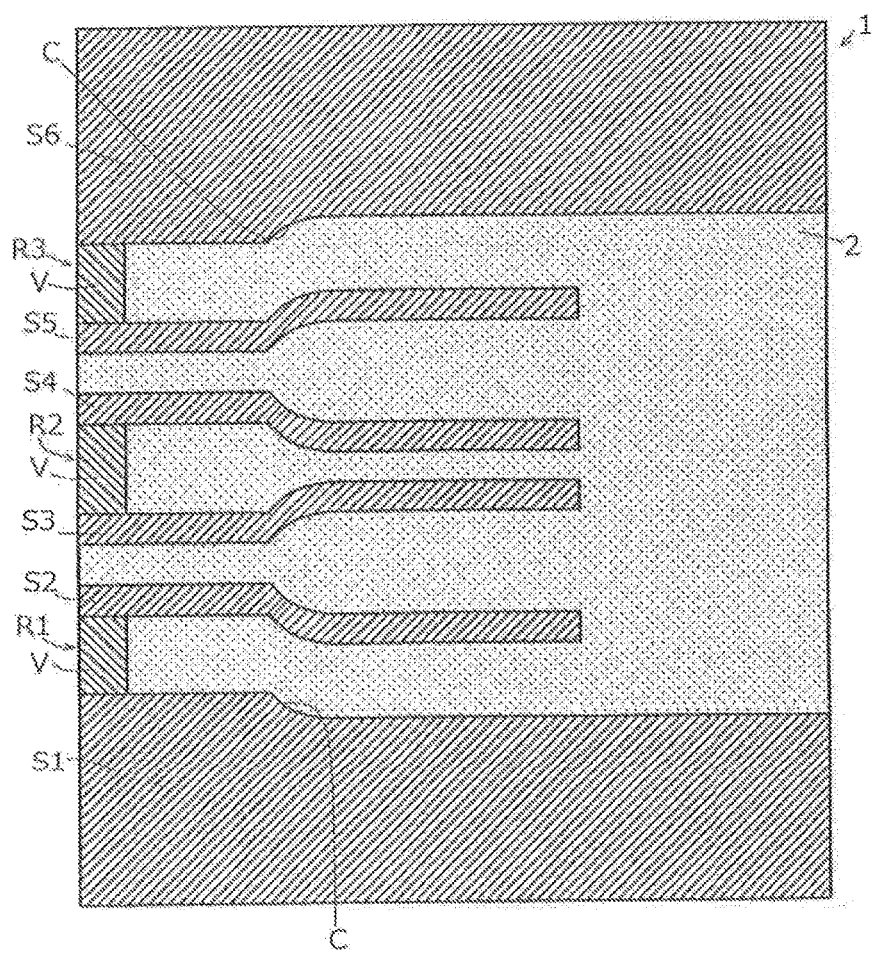

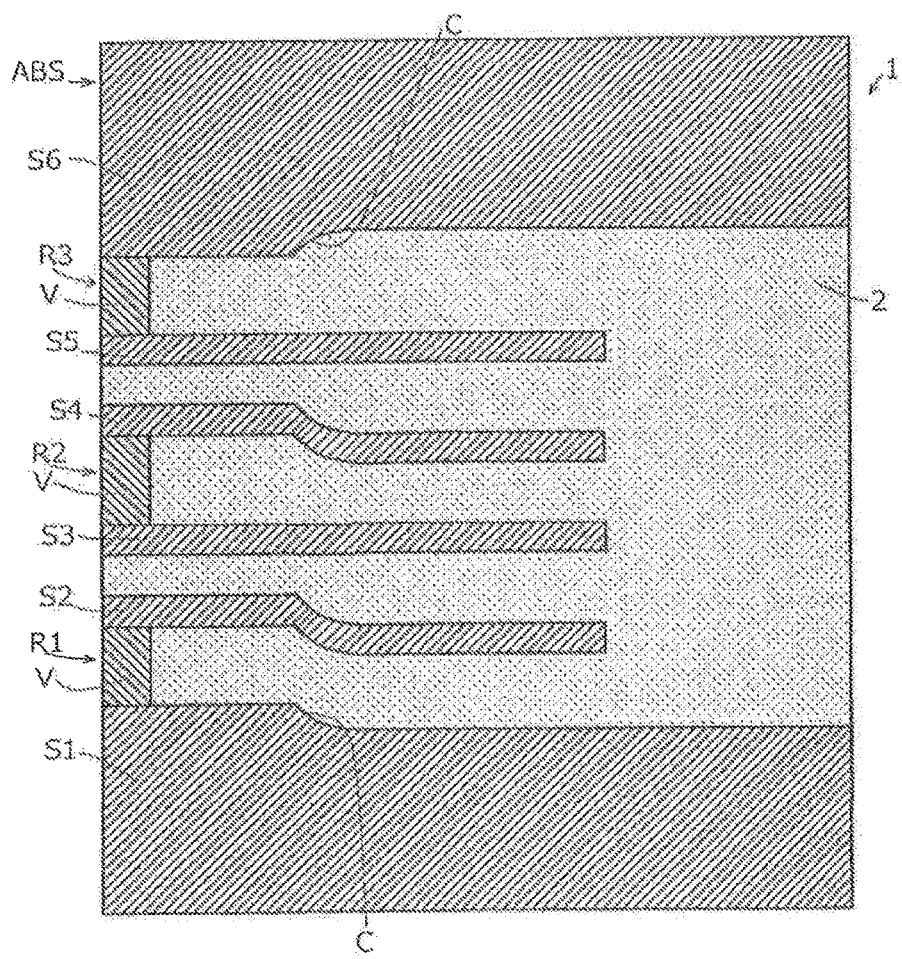

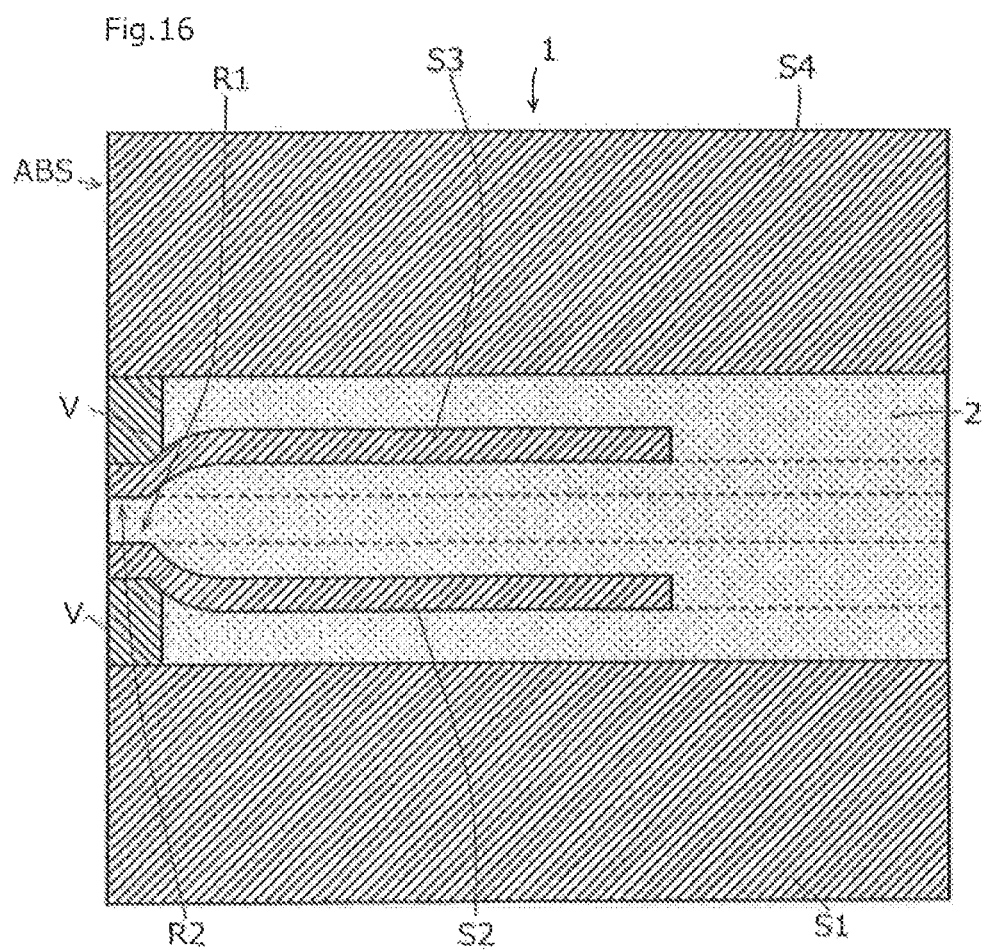

MULTI READER HEAD HAVING A VARYING GAP LAYER LAMINATED BETWEEN READERS

BACKGROUND OF THE INVENTION

1. Field of the Invention

The present invention relates to a multi reader head of a hard disk drive (HDD).

2. Description of the Related Art

In order to enhance area density capacitance (ADC) in recent HDDs, a multi reader head having a plurality of readers is being developed. The reader includes a magneto-resistive effect element (MR element), such as a tunnel magneto-resistance effect (TMR) element or a giant magneto-resistance effect (GMR) element, as a primary component.

A head with a configuration where two MR elements that overlap via a common bias layer are interposed between a pair of shields is disclosed in U.S. Pat. No. 6,819,530B2. A head with a configuration where two MR elements overlap via a common antiferromagnetic layer is disclosed in US2003/0011939A1. In these configurations, two readers share a bias layer or an antiferromagnetic layer and are not independent from each other. A configuration where two readers, which have a structure where an MR element is interposed between a pair of shields, and are independent from each other and overlap via an insulating layer, is disclosed in US2011/0216432A1. In such a configuration where a plurality of readers that are independent from each other overlap via an insulating layer, in the case when each reader is composed of a current-perpendicular-to-plane (CPP) type TMR element or GMR element where a current flows in a direction perpendicular to the principal plane of each layer, and there is a positional relationship between a reader that is situated at the lower side in a lamination direction and another reader that is situated at the upper side in the lamination direction, and accuracy of the width and height of each reader is very important, and sophisticated processing and control are required. In particular, it is important to reduce the distance between the readers (RRS: Reader-Reader Separation) affecting the reading accuracy of adjacent tracks as much as possible, and such reduction is a key factor for obtaining a characteristic of a multi reader head. Furthermore, the RRS is the distance between center lines of free layers in the lamination direction in the MR elements of readers, which are adjacent in the lamination direction.

As described above, in a multi reader head where a plurality of readers overlap, it is necessary to reduce the RRS to, for example, approximately several tens of nm. As shown in FIGS. 1A and 1B, if a lower shield and an upper shield that interpose an MR element V in a reader R1 situated on a lower side are indicated as S1 and S2, respectively, and a lower shield and an upper shield that interpose an MR element V in a reader R2 situated on an upper side are indicated as S3 and S4, respectively, in order to reduce the RRS as much as possible, it is desirable to reduce the distance D23 between the reader R1 and the reader R2, i.e., the distance D23 between the shield S2 and the shield S3, the distance D12 between the lower shield S1 and the upper shield S2 of the reader R1 and the distance D34 between the lower shield S3 and the upper shield S4 of the reader R2, respectively. Furthermore, in the entire specification, regardless of a posture or the like at the time of using the multi reader head, the lamination direction of the plurality of readers is defined as the upward/downward direction, and one side in the lamination direction is indicated as "upper" and the other side is indicated as "lower." Specifically, the relationship between "upper" and "lower" is defined such that the reader formed first in the manufacturing process of the multi reader head is referred to as "lower-side reader" and the reader that is laminated and formed later is referred to as "upper-side reader." Even when "upper" and "lower" are indicated relative to each member within each reader and various members other than the reader, these are expressed based upon the definition set forth here.

Further, since the number of rotations of the HDD becomes greater and the recording bit size becomes smaller in association with the improvement of recording density in recent HDDs, a high-frequency noise component is easily generated. In order to eliminate the high-frequency noise component, it is preferable to reduce capacitance between each shield of the readers as much as possible. Then, the capacitance between the shields decreases as the distance between the shields increases.

In other words, the reduction of the RRS as much as possible in order to enhance the reading accuracy of adjacent tracks and the increase in the distance between the shields as much as possible in order to reduce the capacitance between the shields are a trade-off. A countermeasure to reduce the capacitance in the case of consistent RRS by changing the material of the insulating layer situated between the shields from common aluminum oxide (for example, $Al_2O_3$) to silicon oxide (for example, $SiO_2$) with a smaller permittivity may be considered. However, the capacitance between the shields cannot be sufficiently reduced only by changing the material of the insulating layer. In particular, since the capacitance between the readers, which did not exist in a head with only a single reader, is an issue in a multi reader head, it is desirable to reduce this capacitance as much as possible.

SUMMARY OF THE INVENTION

The objective of the present invention is to provide a multi reader head that can reduce capacitance between shields while preventing an increase of RRS.

The multi reader head of the present invention has a plurality of readers laminated via a gap layer(s); each of the readers includes a structure where a current-perpendicular-to-plane (CPP) type magneto-resistive effect element (MR element), where a current flows along a lamination direction, is interposed between a pair of shields that function as an electrode, respectively, from both sides in the lamination direction; the distance between the shields that are opposed from each other across the gap layer in the readers that are adjacent in the lamination direction is not constant, but includes a portion with a greater distance between the shields and another portion with a smaller distance between the shields; and the portion with a greater distance between the shields is situated farther away from the center on an air bearing surface opposing a recording medium in the magneto-resistive effect element compared to the portion with a smaller distance between the shields.

Another multi reader head of the present invention has a plurality of readers laminated via a gap layer(s); each of the readers has a structure where a current-perpendicular-to-plane (CPP) type of magneto-resistive effect element, where a current flows in a lamination direction, is interposed between a pair of shields that function as an electrode, respectively, from both sides in the lamination direction; and either one or both of the shields that are opposed across the gap layer in the readers that are adjacent in the lamination direction have a portion that is bent or curved toward the directions where the shields are away from each other.

BRIEF DESCRIPTION OF THE DRAWINGS

FIG. 1A is a front view showing an ABS of a conventional multi reader head;

FIG. 2A is a front view showing an ABS of a multi reader head in one embodiment of the present invention;

FIG. 3 is an exploded perspective view showing one reader of the multi reader heads shown in FIGS. 2A and 2B;

FIG. 5B is a cross-sectional view that is orthogonal to the ABS showing the step shown in FIG. 5A;

FIG. 6A is a front view showing a step following the step shown in FIGS. 5A and 5B;

FIG. 6B is a cross-sectional view that is orthogonal to the ABS showing the step shown in FIG. 6A;

FIG. 9A is a front view showing a step following the step shown in FIGS. 8A and 8B;

FIG. 10A is a front view showing a step following the step shown in FIGS. 9A and 9B;

FIG. 10B is a cross-sectional view that is orthogonal to the ABS showing the step is shown in FIG. 10A;

FIG. 12A is a front view showing an ABS of a multi reader head in yet another embodiment of the present invention;

FIG. 12B is a cross-sectional view that is orthogonal to the ABS of the multi reader head shown in FIG. 12A;

FIG. 14A is a front view showing an ABS of a multi reader head in yet another embodiment of the present invention;

FIG. 14B is a cross-sectional view that is orthogonal to the ABS of the multi reader head shown in FIG. 14A;

FIG. 15B is a cross-sectional view that is orthogonal to the ABS of the multi reader head shown in FIG. 15A;

FIG. 16 is a cross-sectional view that is orthogonal to an ABS of a multi reader head in yet another embodiment of the present invention;

DETAILED DESCRIPTION OF THE INVENTION

Embodiments of the multi reader head of the present invention are explained hereafter with reference to the attached drawings.

First Embodiment

Figure 2B:
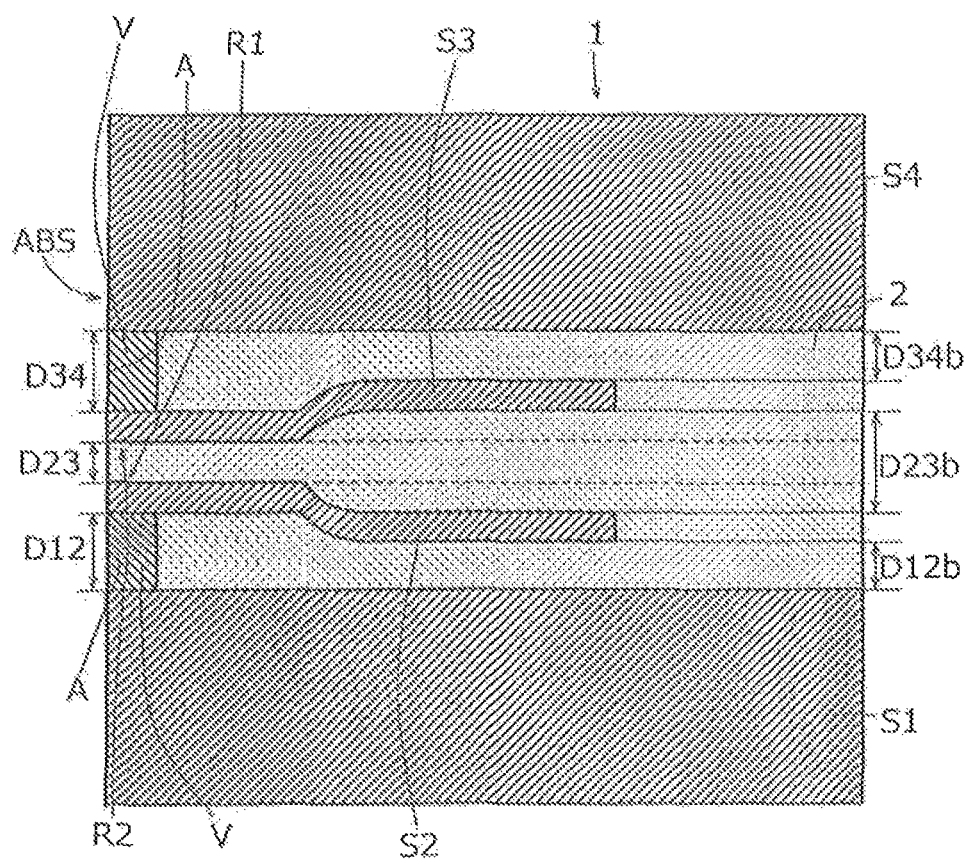
FIG. 2B is a cross-sectional view that is orthogonal to the ABS of the multi reader head shown in FIG. 2A.

A basic structure of a multi reader head 1 of the first embodiment of the present invention is shown in FIGS. 2A and 2B. In the multi reader head 1, a plurality (two in the example shown in FIGS. 2A and 2B) of the readers R1 and R2 is arranged so as to overlap in planar view manner, and a surrounding material 2 that functions as an inter-element insulating layer (gap layer) exists between the readers R1 and R2 that are adjacent in the lamination direction.

A reader R of the present invention has a configuration where a magneto-resistive effect element (MR element) V, which is a spin valve-type multilayer film, is interposed between a pair of shields S as shown in FIG. 3. The MR element V primarily has a free layer 3 having a magnetization direction that fluctuates relative to an external magnetic field, a pinned layer 4 having a magnetization direction that is pinned against an external magnetic field, a spacer layer 5 positioned between the free layer 3 and the pinned layer 4 and a pinning layer 6 that pins a magnetic field of the pinned layer 4 and that is adjacent to the pinned layer 4. Further, the MR element V may further include a buffer layer and/or a cap layer that are not shown. The lamination direction of each layer in the MR element V matches that of the plurality of readers. The MR element V is exposed on an air bearing surface ABS that is opposed to a recording medium (not shown), the plan area viewed from the upper side in the lamination direction is small, and a portion where the MR element V does not exist is embedded with the surrounding material 2 (see FIGS. 2A and 2B). One example of the MR element V is a CPP-TMR element where current flows in the lamination direction (the direction perpendicular to the principal plane of each layer), and the spacer layer 5 in that case is a tunnel barrier layer. However, the MR element V may be a CPP-GMR element, and the space layer 5 in that case may be a nonmagnetic layer.

As shown in FIGS. 2A and 2B, in the multi reader head 1 of the present embodiment, the readers R shown in FIG. 3 are arranged so as to perpendicularly overlap, the surrounding material 2 is disposed between the readers R, and the space on the sides of the readers R is also filled with the surrounding material 2. In the multi reader head 1, in order to reduce the RRS so as to improve the reading accuracy of the track in the vicinity, the upper shield S2 of the lower-side reader R1 and the lower shield S3 of the upper-side reader R2 are formed to be thin, and the distance between the upper shield S2 and the lower shield S3 is reduced as much as possible. In the present embodiment, as shown in FIG. 2A, in the ABS, the lower shield S3 of the upper-side reader R2 and the upper shield S2 of the lower-side reader R1 are bent or curved in directions away from each other, i.e., the lower shield S3 of the upper-side reader R2 is bent or curved upwardly and the upper shield S2 of the lower-side reader R1 is bent or curved downwardly, at positions on the sides of the MR element V (for example, positions away from both ends of the MR element V within the ABS by 200 to 300 nm). In addition, in the present embodiment, as shown in FIG. 2B, the lower shield S3 of the upper-side reader R2 and the upper shield S2 of the lower-side reader R1 are bent or curved in directions away from each other, at positions away from the ABS, for example, at positions away from the end parts at the opposite sides from the ABS of the MR elements V by approximately 200 to 300 nm, even in a direction that is perpendicular to the ABS and the lamination direction. In other words, even in the ABS and in the direction that is perpendicular to the ABS, the lower shield S3 of the upper-side reader R2 is bent or curved upwardly and the upper shield S2 of the lower-side reader R1 is bent or curved downwardly, i.e., in the directions where they are away from each other at positions that do not overlap with the MR elements V. As a result, the distance between the lower shield S2 and the upper shield S3 is not constant. The lower shield S2 and the upper shield S2 include portions with greater distances and another portion with a smaller distance. The portions with greater distances between the shields S2 and S3 (portions with the distances D23a and D23b) are situated at positions farther away from a center A in the ABS compared to the portion with a smaller distance (a portion where the distance D23 is substantially equal to the thickness of the MR element V), for example, at positions that do not overlap with the MR element V. Furthermore, it is preferable that positions that do not overlap with the MR element V be positions that do not overlap with both the MR elements V in the reader situated immediately above the corresponding shield and the MR element in the reader situated immediately below the corresponding shield, in a plan view.

Distances between the shields in the present embodiment are explained hereafter with reference to FIGS. 2A and 2B. The distance D34 (30 nm as one example) between the upper shield S4 and the lower shield S3 of the upper-side reader R2 substantially matches the thickness of the MR element V of the upper-side reader R2. The distance D12 (30 nm as one example) between the upper shield S2 and the lower shield S1 of the lower-side reader R1 matches the thickness of the MR element V of the lower-side reader R1, at positions that overlap with the MR elements V. Then, the distance D23 (10 nm as one example) between the upper shield S2 of the lower-side reader R1 and the lower shield S3 of the upper-side reader R2 at a position that overlaps with the MR element V exists. In the meantime, at positions that do not overlap with the MR elements V, because the upper shield S2 of the lower-side reader R1 and the lower shield S3 of the upper-side reader R2 are bent or curved, portions where the distances between the upper shield S4 and the lower shield S3 of the upper-side reader R2 are narrowed down to the distances D34a and D34b (approximately 20 nm as one example) and portions where the distances between the upper shield S2 and the lower shield S1 of the lower-side reader R1 are narrowed down to the distances D12a and D12b (approximately 20 nm as one example) exist. Then, at positions that do not overlap with the MR elements V, portions where the distances between the upper shield S2 of the lower-side reader R1 and the lower shield S3 of the upper-side reader R2 are widened to the distances D23a and D23b (approximately 30 nm as one example) exist. From the viewpoint of simplicity in the manufacturing process, it is preferable that the distance D12a and the distance D12b match, the distance D23a and the distance D23b match and the distance D34a and the distance D34b also match.

In a multi reader head 1 having a plurality of readers R1 and R2 that are independent from each other, a special problem that a high-frequency noise component is generated between the adjacent readers R1 and R2 is developed, and it is particularly important to remove the high-frequency noise component in this portion. In the present embodiment, the distance between the upper shield S2 of the lower-side reader R1 and the lower shield S3 of the upper-side reader R2 is increased. Out of the entire planar areas of the lower shield S3 and the upper shield S2, only a small range of the ABS and its vicinity have the small distance D23, which is as small as the conventional distance, between the opposite surfaces of the lower shield S3 and the upper shields S2. Other portions have the distances D23a and D23b, which are greater than the distance D23 (D23a=D23b in one example), between the opposite surfaces of the lower shield S3 and the upper shield S2. Therefore, compared to the configuration where the lower-part shied S3 and the upper shield S2 are opposed to each other with the uniform distance D23 (see FIGS. 1A and 1B) between the entire opposite surfaces of the lower shield S3 and the upper shield S2, the capacitance generated between the lower shield S3 and the upper shield S2 is smaller. As a result, the high-frequency noise component between the adjacent readers R1 and R2 can be eliminated, and the issue that is unique in the multi reader head 1 can be resolved. Furthermore, for the purpose reducing the capacitance, it is preferable that the surrounding material 2 positioned among the shields S1 to S4 is made from a material with small permittivity (for example, silicon oxide, such as $SiO_2$).

In the present embodiment, portions having the distance D34a or D34b, which are smaller than the conventional distance D34, are generated between the upper shield S4 and the lower shield S3 of the upper-side reader R2, and portions having the distance D12a or D12b, which are smaller than the conventional distance D12, is generated between the upper shield S2 and the lower shield S1 of the upper-side reader R1. However, because an effect of an increase in the distance between the upper shield S2 of the lower-side reader R1 and the lower shield S3 of the upper-side reader R2 is extremely great, it is sufficiently useful.

In the multi reader head 1 of the present embodiment, the MR element V is positioned at the ABS and its vicinity, and the upper shield S2 of the lower-side reader R1 and the lower shield S3 of the upper-side reader R2 are opposed at the distance D23, which is the same as the conventional distance, at the portions that overlap with the MR elements V. Therefore, the distance between the MR element V of the lower-side reader R1 and that of the upper-side reader R2, i.e., the RRS, is maintained as small as the conventional distance. Consequently, in the present embodiment, the RRS can be decreased, and high reading accuracy in the close track can be maintained.

In the explanation above, elements other than the shields S1 to S4 and the MR elements V are all indicated as the surrounding material 2. In actuality, the surrounding material 2 may contain various members, such as a bias layer, a soft magnetic layer or an insulating layer, but since the material, the detailed function and the like of the surrounding material 2 do not matter in the present specification, these are generally indicated as being the surrounding material 2.

Figure 4A:
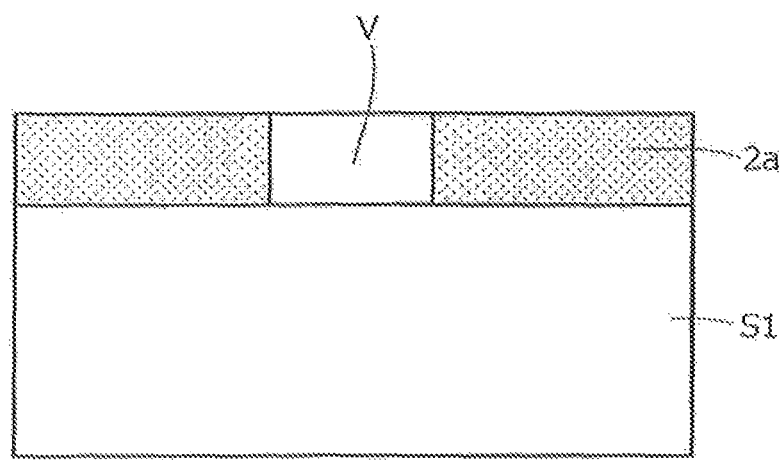
FIG. 4A is a front view showing one step in one example of a method for manufacturing the multi reader heads shown in FIGS. 2A and 2B.
Figure 4B:
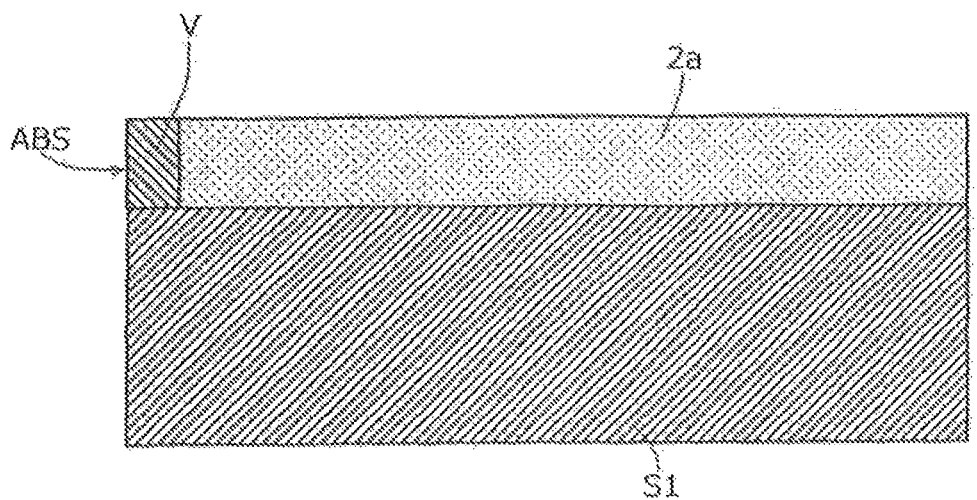
FIG. 4B is a cross-sectional view that is orthogonal to the ABS showing the step shown in FIG. 4A.
Figure 5A:
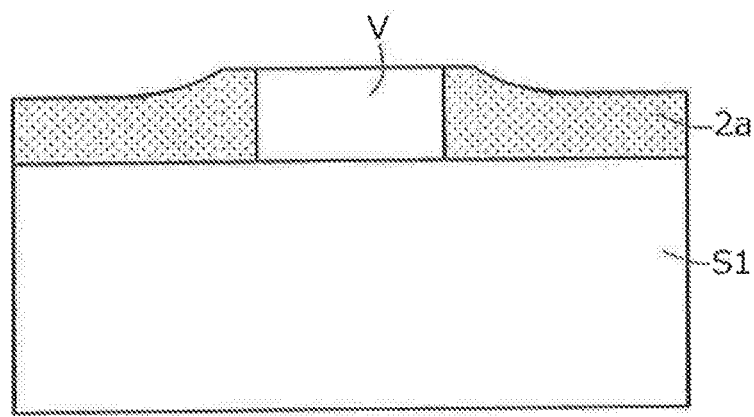
FIG. 5A is a front view showing a step following the step shown in FIGS. 4A and 4B.

Next, a method for manufacturing the multi reader head in the present embodiment is explained. First, as shown in FIGS. 4A and 4B, the lower shield S1 in the reader R1 positioned on the lower side is formed with plating and is planarized by chemical mechanical polishing (CMP), and the MR element V is formed on a portion of the lower shield S1. The MR element V contains at least the free layer 3, the pinned layer 4, the spacer layer 5 and the pinning layer 6 as shown in FIG. 3, and is formed to be exposed to the ABS. Then, a surrounding material 2a that surrounds the MR element V is formed on a portion where no MR element V is formed on the lower shield S1. The surrounding material 2a may be a bias layer, a soft magnetic layer, or an insulating layer or the like, and can be an assembly of these. The upper surface of the surrounding material 2a is preferably flat, and is positioned at the same height as the upper surface of the MR element V. Then, as shown in FIGS. 5A and 5B, the upper surface of the surrounding material 2a is processed, such as by milling, so as to be concave. Specifically, the surrounding material 2a is excavated to be continuously lower from the same height as the upper surface of the MR element V to a predetermined height from a position recessed from an end portion of the MR element V, for example, by approximately 200 nm to 300 nm.

Subsequently, as shown in FIGS. 6A and 6B, an upper shield S2 is formed astraddle the upper surface of the MR element V and the upper surface of a portion of the surrounding material 2a situated at its periphery. A primary portion of the lower-side reader R1 is configured with this process. Since the height of the surrounding material 2a around the MR element V is continuously decreased, the upper shield S2 is bent or curved downwardly outside the MR element V.

Figure 7A:
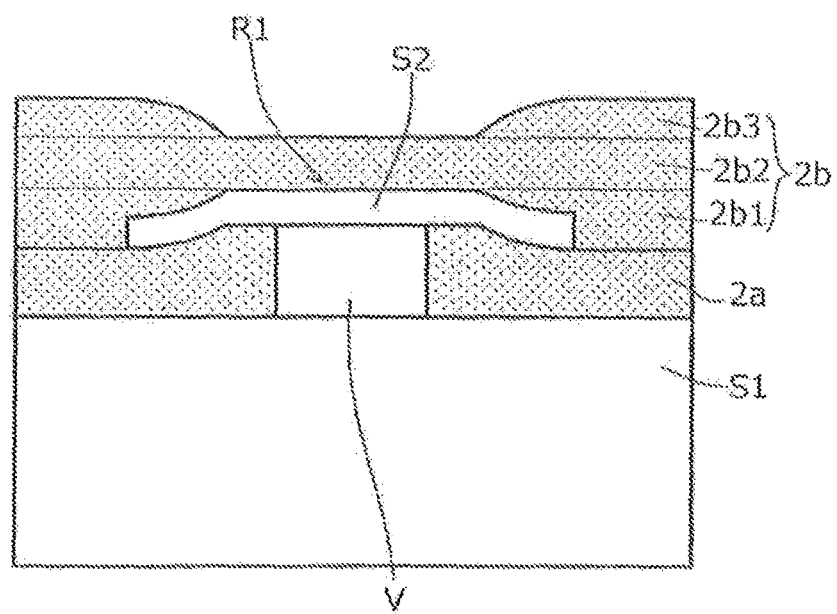
FIG. 7A is a front view showing a step following the step shown in FIGS. 6A and 6B.
Figure 7B:
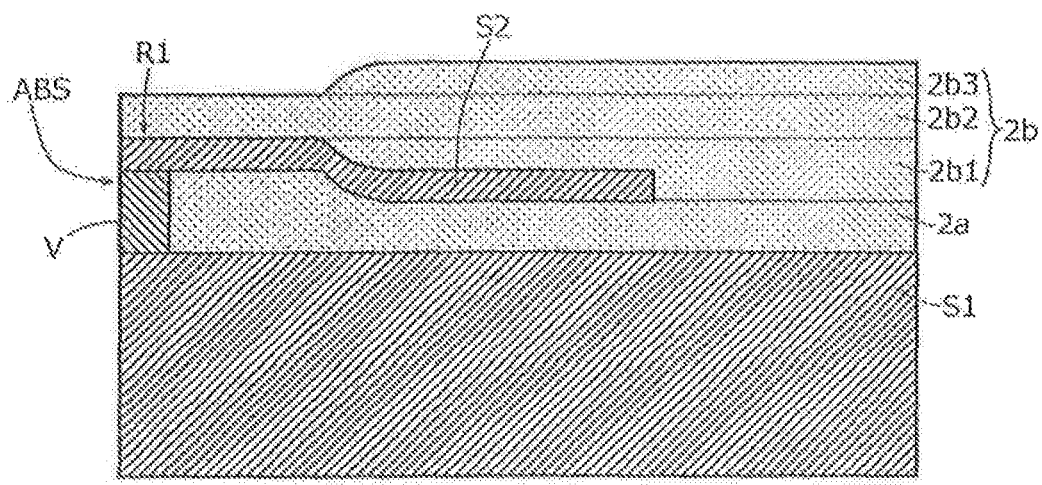
FIG. 7B is a cross-sectional view that is orthogonal to the ABS showing the step shown in FIG. 7A.

Consequently, a surrounding material 2b1 shown in FIGS. 7A and 7B is additionally formed on a portion of the surrounding material 2a where no upper shield is formed, under a condition where the upper shield S2 is formed over the upper surface of the MR element V and over a portion of the upper surface of the surrounding material 2a. The surrounding material 2b1 may be an insulating layer made from silicon oxide, such as SiO2. The portion of the surrounding material 2a that has been excavated by milling or the like is back-filled. In addition, a surrounding material 2b2 is formed over the surrounding material 2b1 and the MR element V. It can be stated that this surrounding material 2b2 is an inter-element insulating layer made from silicon oxide, such as SiO2. Then, a surrounding material 2b3 is additionally formed in a region other than the portion of the surrounding material 2b2 where the MR element V of the upper-side reader R2 is formed, and is patterned. The surrounding material 2b3 has a convex shape where its height is continuously increased until reaching a predetermined height, around the portion where the MR element V is formed. The surrounding materials 2b1 to 2b3 formed in these steps function as an inter-element insulating layer (gap layer) that insulates the lower-side reader R1 and the upper-side reader R2 from each other, and function to regulate the bent shape or curved shape of the upper shield S2 of the lower-side reader R1 and the lower shield S3 of the upper-part reader R2 or to correspond to the bent shape or the curved shape. The surrounding materials 2b1 to 2b3 may be collectively referred to as a surrounding material 2b.

Figure 8A:
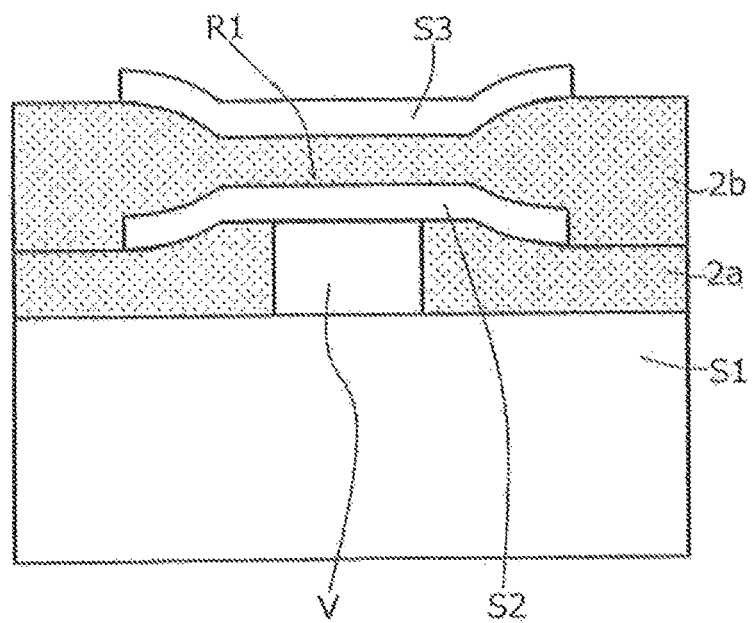
FIG. 8A is a front view showing a step following the step shown in FIGS. 7A and 7B.
Figure 8B:
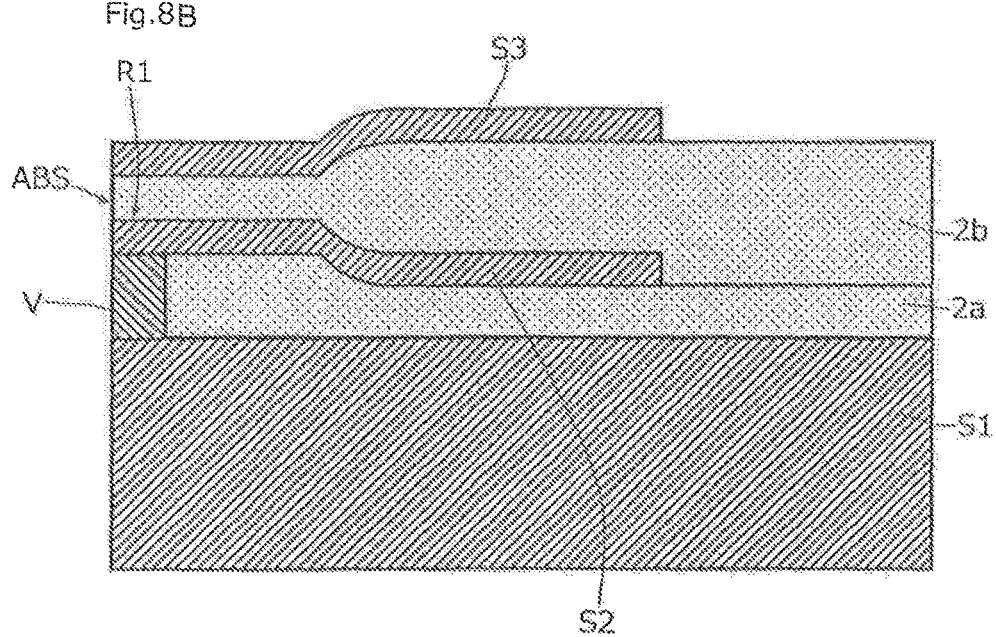
FIG. 8B is a cross-sectional view that is orthogonal to the ABS showing its step is shown in FIG. 8A.
Figure 9B:
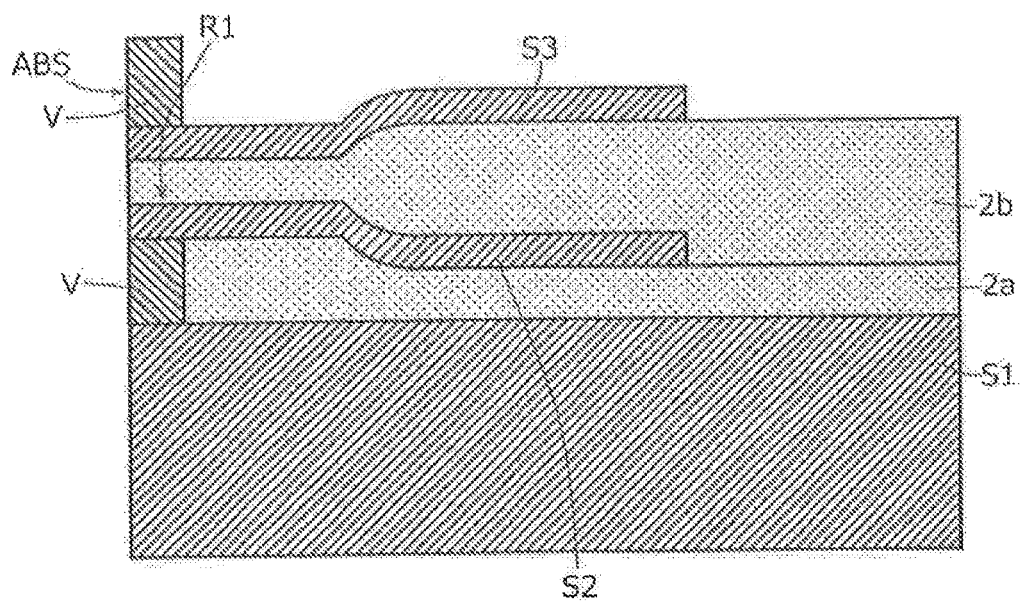
FIG. 9B is a cross-sectional view that is orthogonal to the ABS showing the step is shown in FIG. 9A.

Next, as shown in FIGS. 8A and 8B, the lower shield S3 of the upper-side reader R2 is formed. Since a portion of the surrounding material 2b is convex, the lower shield S3 becomes bent or curved upwardly outside the portion where the MR element V is formed. Then, as shown in FIGS. 9A and 9B, the MR element V of the upper-side reader R2 is formed. The MR element V is situated in the lowest portion of the lower shield S3. Then, as shown in FIGS. 10A and 10B, a surrounding material 2c is formed on the lower shield S3 and the surrounding material 2b except for the portion where the MR element V is formed. An upper surface of the surrounding material 2c should be preferably formed to be flat at this time, and the upper shield S4 is formed on the MR element V and the surrounding material 2c at last, thereby configuring the upper-side reader R2. Consequently, the primary portions of the multi reader head 1 shown in FIGS. 2A and 2B are completed. The surrounding materials 2a, 2b and 2c formed in a plurality of stages may be collectively indicated as the surrounding material 2 by considering them as being integrated within the completed multi reader head 1.

In the manufacturing method explained above, the surrounding materials 2b1, 2b2 and 2b3 are formed in different steps in order, but these may be collectively formed. Further, after the surrounding material 2b2 and 2b3 are collectively formed as a thick layer, these are patterned by milling or the like, and these can be integrally formed by forming the portion where the MR element V is formed and its periphery to be lower, as shown in FIGS. 7A and 7B.

In the manufacturing method described above, the upper surface of the surrounding material 2a is formed to be flat, and the upper surface of the surrounding material 2c is formed to be flat, but it is not always necessary for these surfaces to be flat.

The surrounding materials 2b1 and 2b3 are insulating layers made from silicon oxide, such as $SiO_2$, the total thickness of which is equivalent to the difference between the maximum value for the distance between the upper shield S2 and the lower shield S3 at a position that does not overlap with the MR element V and the distance of the position that is overlaps with the MR element V, and the thickness of the insulating layers is a shift distance due to bending or curvature toward the directions where the shields S2 and S3 are respectively away from each other.

Figure 11:
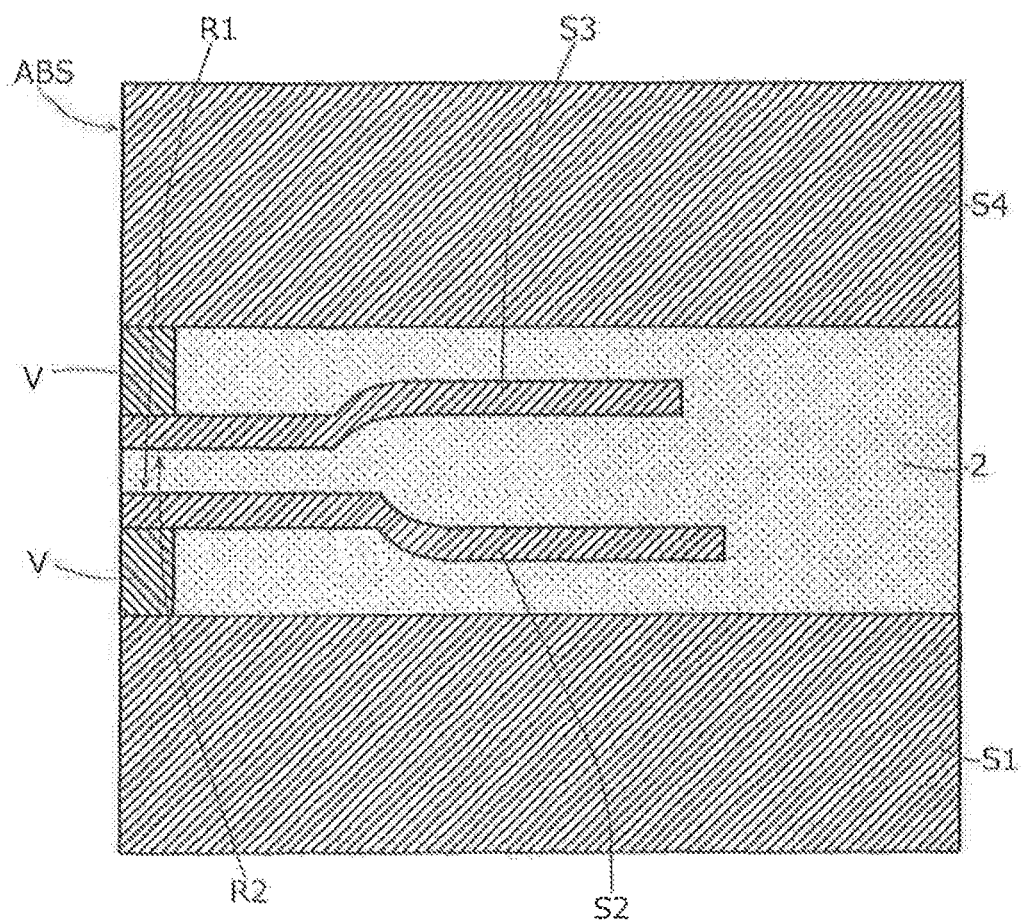
FIG. 11 is a cross-sectional view that is orthogonal to an ABS in a multi reader head in another embodiment of the present invention.

FIG. 11 shows another embodiment of the multi reader head of the present invention. In the first embodiment above, the upper shield S2 of the lower-side reader R1 and the lower shield S3 of the upper-side reader R2 are symmetrically shaped via the surrounding material 2b. However, in the embodiment shown in FIG. 11, the upper shield S2 of the lower-side reader R1 and the lower shield S3 of the upper-side reader R2 are not symmetrically shaped via the surrounding material 2b; rather, their bent or curved portions are at positions that are shifted from each other. This is for the purpose of balancing the capacitance in each part. In other words, positions to bend or curve the upper shield S2 of the lower-side reader R1 and the lower shield S3 of the upper-side reader R2 are shifted in order to appropriately balance the capacitance generated between the lower shield S1 and the upper shield S2 of the lower-side reader R1, the capacitance generated between the upper shield S2 of the lower-side reader R1 and the lower shield S3 of the upper-side reader R2 and the capacitance generated between the lower shield S3 and the upper shield S4 of the upper-side reader R2. In other words, a portion opposed at a distance greater than the distance at the positions that overlap with the MR element includes a portion where its distance has been widened due to a shift in either the lower shield S3 or the upper shield S2 (a portion where the surrounding layer 2b shown in FIGS. 7A and 7B includes one additional layer of the insulating layer 2b3) and another portion where its distance is widened due to shifts of both the lower shield S3 and the upper shield S2 (a portion where the surrounding layer 2b shown in FIGS. 7A and 7B includes two additional layers of the insulating layers 2b1 and 2b3), at positions of the lower shield S2 and the upper shield S3 that do not overlap with the MR element V. Thus, considering the dimensions of each part or the like, the capacitance of each part is appropriately adjusted by shifting the positions of the shields to be bent or curved. Since other configurations and the manufacturing methods are similar to those of the first embodiment, explanations are omitted.

FIGS. 12A and 12B further show another embodiment of the multi reader head 1 of the present invention. In the first embodiment above, while the distance between the upper shield S2 of the lower-side reader R1 and the lower shield S3 of the upper-side reader R2 is increased and the capacitance is decreased, the distance between the upper shield S4 and the lower shield S3 of the upper-side reader R2 and the distance between the upper shield S2 and the lower shield S1 of the lower-side reader R1 are decreased; therefore, the capacitance in these sites is increased.

In the meantime, in the embodiment shown in FIGS. 12A and 12B, concave portions C corresponding to a bent or curved portion of the lower shield S2 of the lower-side reader R1 and bent or curved portion of the lower shield S3 of the upper-side reader R2, respectively, are formed in the lower shield S1 of the lower-side reader R1 and the upper shield S4 of the upper-side reader R2. Insulating layers configuring a portion of the surrounding material 2 are arranged within these concave parts C, respectively. Due to this configuration, the distance between the upper shield S4 and the lower shield S3 of the upper-side reader R2 is maintained at a substantially-constant distance D34, controlling the increase in the capacitance. Similarly, the distance between the upper shield S2 and the lower shield S1 of the lower-side reader R1 is maintained at a substantially-constant distance D12, controlling the increase in the capacitance. In other words, in the present embodiment, while the increase in the capacitance between the upper shield S4 and the lower shield S3 of the upper-side reader R2 and that between the upper shield S2 and the lower shield S1 of the lower-side reader R1 are controlled, since the capacitance between the upper-side shield S2 of the lower-side reader R1 and the lower shield S3 of the upper-side reader R2 is decreased, it is very effective. Furthermore, it is not necessary for the concave portions C of the lower shield S1 of the lower-side reader R1 and the upper shield S4 of the upper-side reader R2 precisely correspond to the bent or curved portions of the upper shield S2 of the lower-side reader R1 and that of the lower shield S3 of the upper-side reader R2, respectively, but it is effective if the reduction in the distance between the shields is controlled by the concave portions C having certain sizes.

Figure 13A:
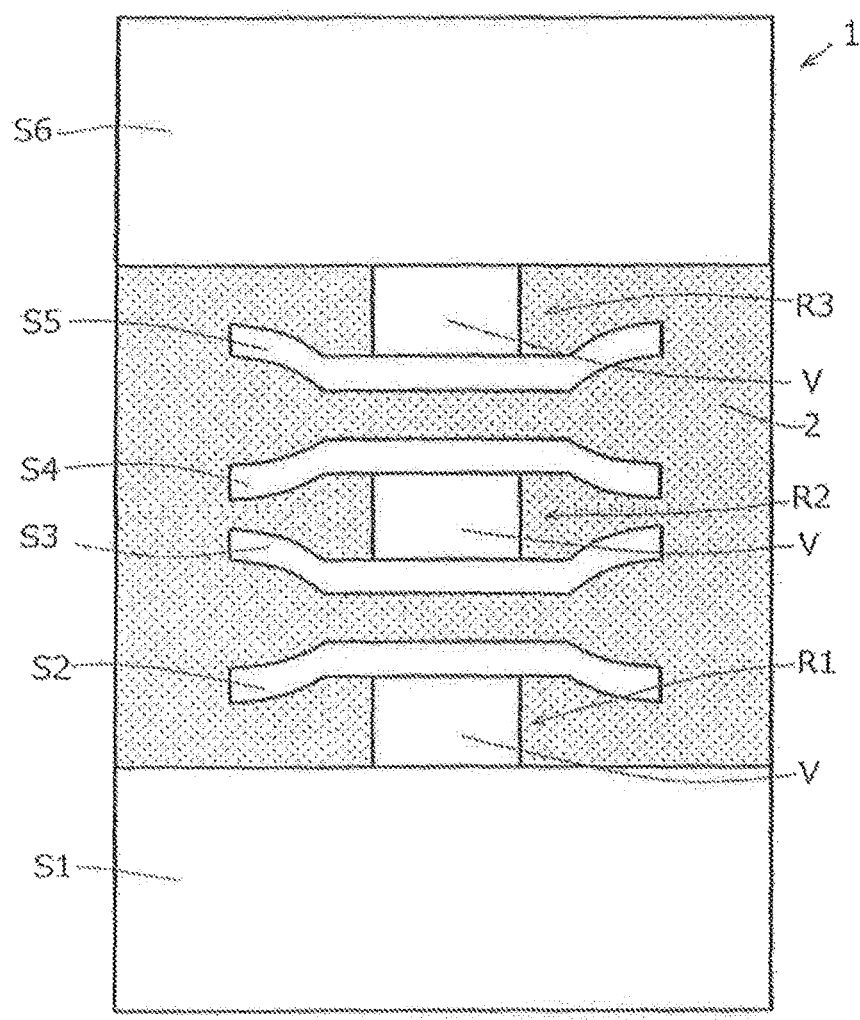
FIG. 13A is front view showing an ABS of a multi reader head in yet another embodiment of the present invention.
Figure 13B:
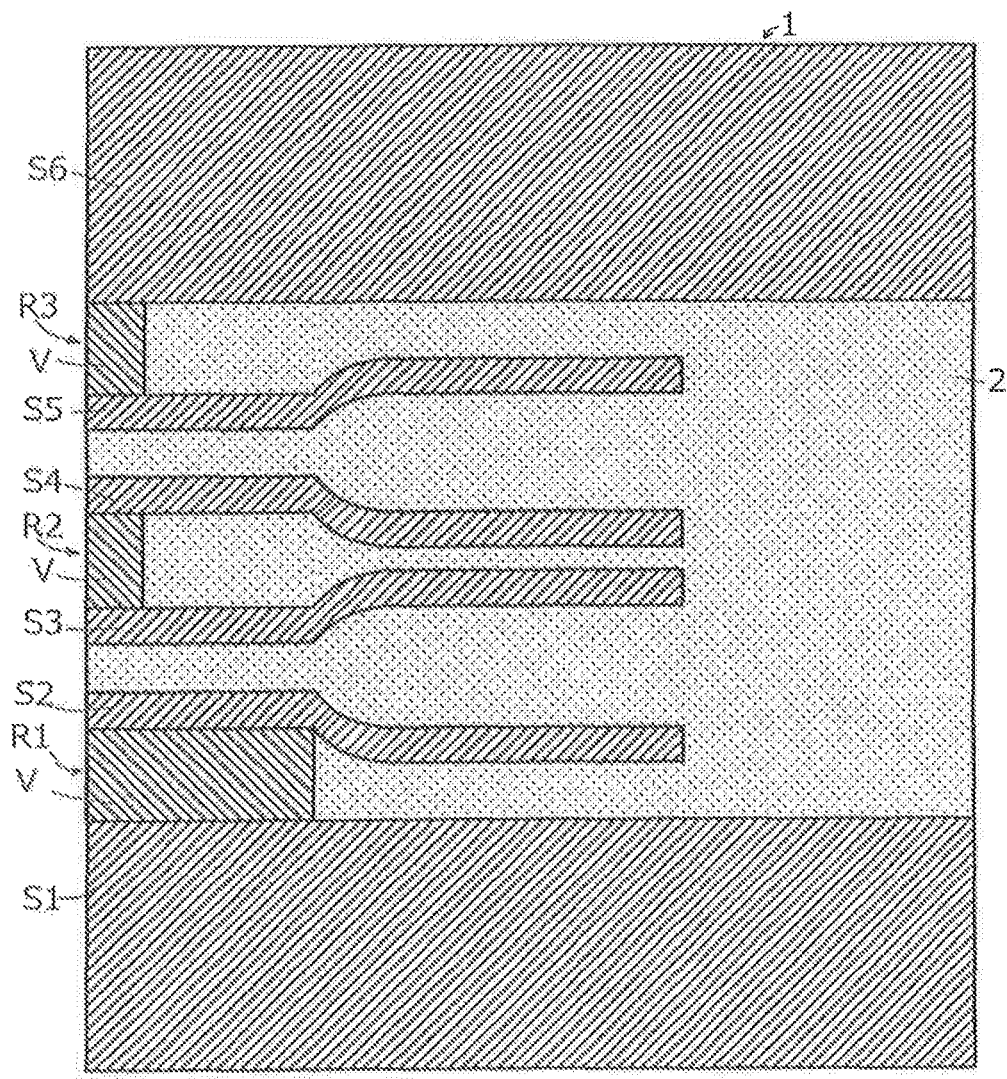
FIG. 13B is a cross-sectional view that is orthogonal to the ABS of the multi reader head shown in FIG. 13A.

Further, as in the embodiment shown in FIGS. 13A and 13B, the present invention is effective even in multi reader heads having three readers R1, R2 and R3 that are arranged so as to overlap each other. In other words, these are configurations where a pair of bent or curved shields similar to the shields S2 and S3 shown in FIG. 2, are doubly formed partially widening the distances between the opposing shields via a gap layer of the readers that are adjacent in the lamination direction. Specifically, the upper shield S2 of the lowest-side reader R1 and the lower shield S3 of the immediately-above (intermediate) reader R2 are bent or curved in a direction where they are away from each other, decreasing the capacitance. In addition, the upper shield S4 of the intermediate reader R2 and the lower shield S5 of the upper-most-part reader R3 are bent or curved in a direction where they are away from each other, decreasing the capacitance. With this process, the capacitance between the reader R1 and the reader R2 is reduced, and the capacitance between the reader R2 and the reader R3 is reduced at the same time, and the high-frequency noise component at each position can be well removed.

In addition, as shown in FIGS. 14A and 14B, in multi reader heads having three readers R1, R2 and R3 that are arranged to overlap each other, and similar to the concave portions C in the configuration shown in FIGS. 12A and 12B, the concave portions C are formed in the lower shield S1 of the lower-most-side reader R1 and an upper shield S6 of the upper-most-side reader R3, controlling the increase in the capacitance between the upper shield S6 and the lower shield S5 of the upper-most-side reader S3 and that between the upper shield S2 and the lower shield S1 of the lower-most-side reader R1.

As an application of this embodiment, even in multi reader head having four or more readers, even though it is not illustrated, a configuration where a pair of bent or curved shields as similar to the shields S2 and S3 shown in FIG. 2 are formed in a triple manner or more is realized by adopting the present invention, thereby obtaining the effect of reducing the capacitance in the portion among the readers.

Figure 1B:
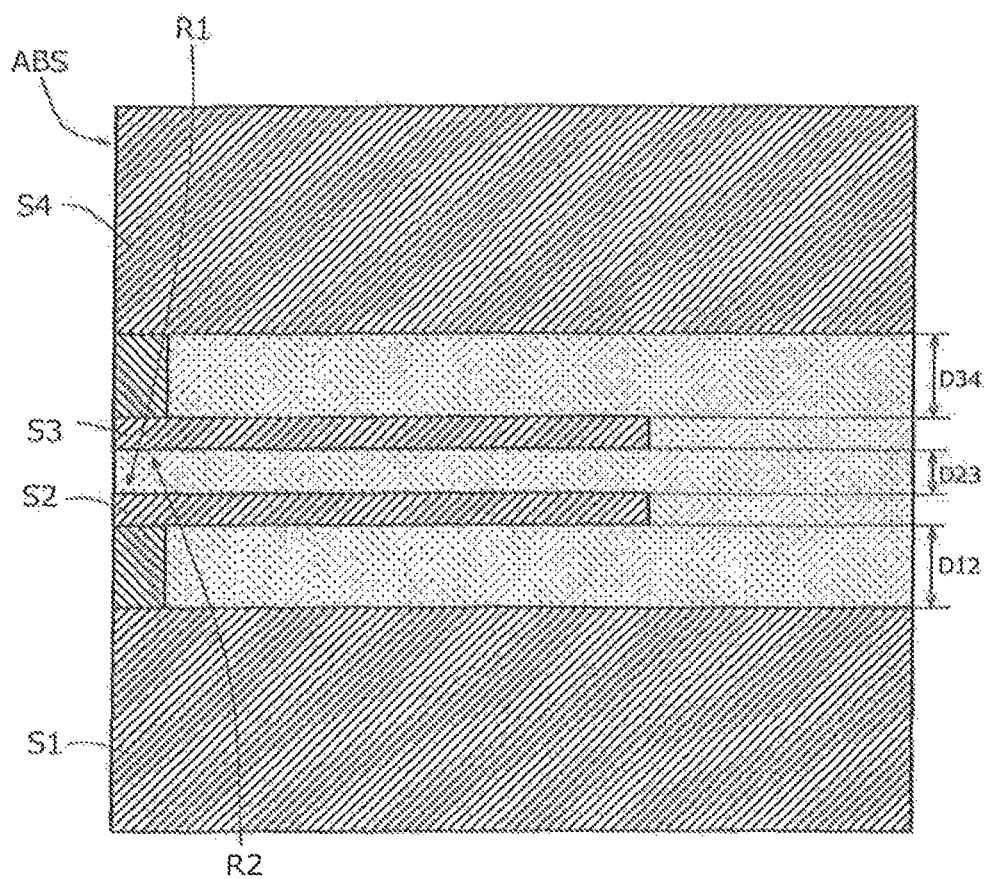
FIG. 1B is a cross-sectional view that is orthogonal to the ABS of the multi reader head shown in FIG. 1A.
Figure 15A:
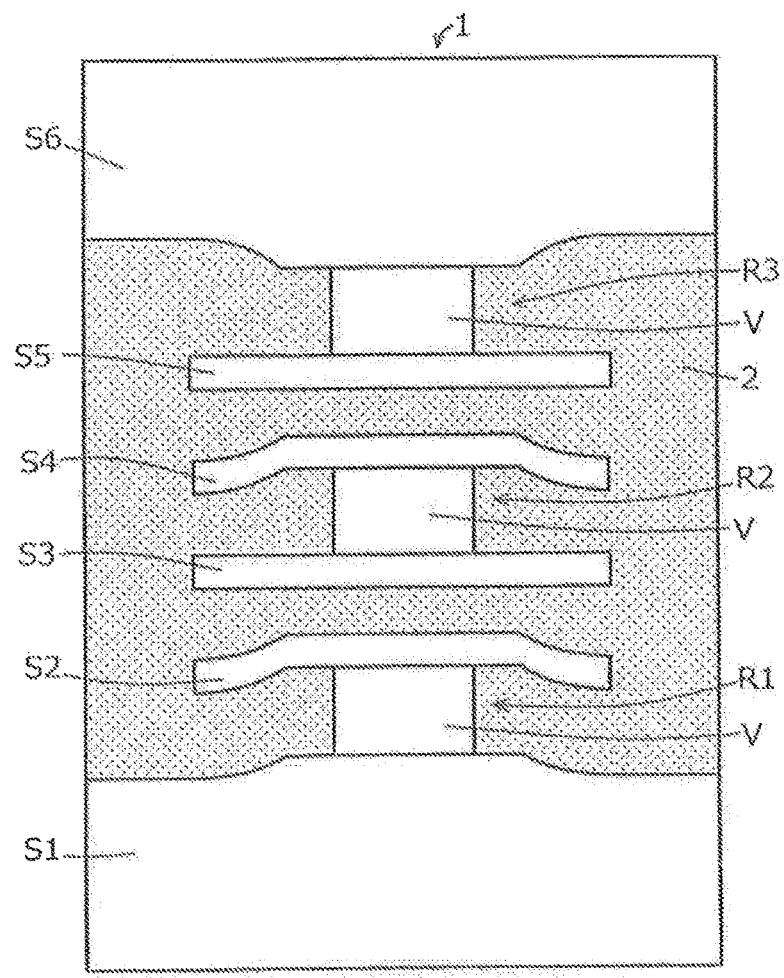
FIG. 15A is a front view showing an ABS of a multi reader head in yet another embodiment of the present invention.

Further, as shown in FIGS. 15A and 15B, any of the shields in a plurality of readers (the lower shields S3 and S5 in the illustrated example) may not be bent or curved, but can be straight shaped, similar to the conventional example shown in FIGS. 1A and 1B. These shapes should be determined appropriately by considering the balance among the capacitance of the parts and complication in the manufacturing steps.

Although not illustrated, even in each embodiment shown in FIGS. 12A to 15B, similar to the embodiment shown in FIG. 11, opposing shields via an insulating layer may have asymmetrical shapes, i.e., may have a configuration with shifted positions where the shields are bent or curved relative to each other.

In each embodiment explained above, the shields are bent or curved at portions that do not overlap with the MR elements V, and the distance between the shields that are opposed across a gap layer is partially widened. However, as shown in FIG. 16, a configuration where bending or curvature of the shields S2 and S3 is started from a position that overlaps with the end of the MR element V can also be realized. In this case, since thickness of the end portion of the MR element V becomes partially thinner by corresponding to the bending or curvature of the shields S2 and S3, shapes, dimensions and the like of the shields S2 and S3 are set so as to partially thin the MR element V to an extent not affecting any of the original functions of the MR element V.

Figure 17:
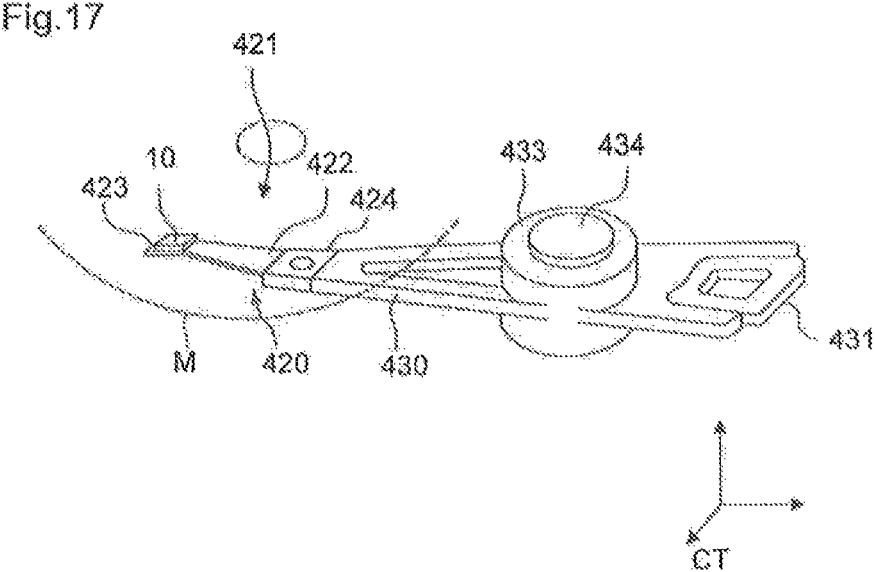
FIG. 17 is a perspective view of a head arm assembly of the present invention.

Next, a head gimbal assembly (HGA) and an HDD where the multi reader head of the present invention has been adopted are explained. The head gimbal assembly (HGA) 421 shown in FIG. 17 is provided with a magnetic head slider 10 that is equipped with multi reader head 1, and a suspension 420 that elastically supports the magnetic head slider 10. The suspension 420 has a plate spring-shaped load beam 422 formed of stainless steel, a flexure 423 disposed at one end part of the load beam 422, and a base plate 424 disposed at the other end part of the load beam 422. The magnetic head slider 10 is joined to the flexure 423, and is given an adequate degree of freedom by the flexure 423. A gimbal part (not shown) for maintaining a posture of the magnetic slider 10 to be constant is disposed in the portion of the flexure 423 where the magnetic head slider 1 is mounted.

The HGA 421 is mounted to an arm 430. The arm 430 moves the magnetic head slider 10 to a cross track direction CT. The base plate 424 is mounted to one end of the arm 430. A coil 431 which is a part of a voice coil motor is mounted to the other end part of the arm 430. A bearing 433 is disposed at an intermediate part of the arm 430. The arm 430 is supported so as to be rotatable by a shaft 434 mounted to the bearing 433. The arm 430 and the voice coil motor that drive the arm 430 configure an actuator.

Figure 18:
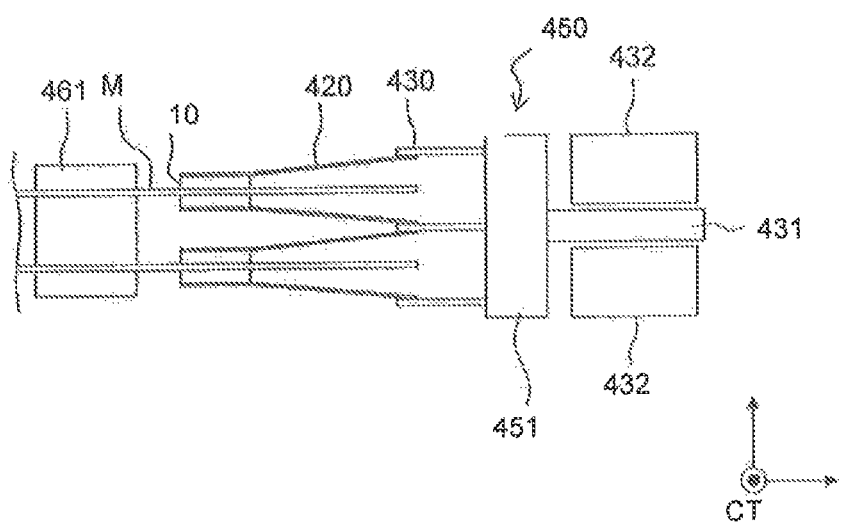
FIG. 18 is a side view of a head stack assembly of the present invention.

FIG. 18 is a side view of a head stack assembly 450. The head stack assembly 450 has a carriage 451 having a plurality of arms 430, and the HGAs 421 mounted to the arms 430, respectively. The HGAs 421 are mounted to the arms 430 so as to align in the height direction at intervals from each other. A pair of permanent magnets 432 are arranged at opposing positions across the coil 431.

Figure 19:
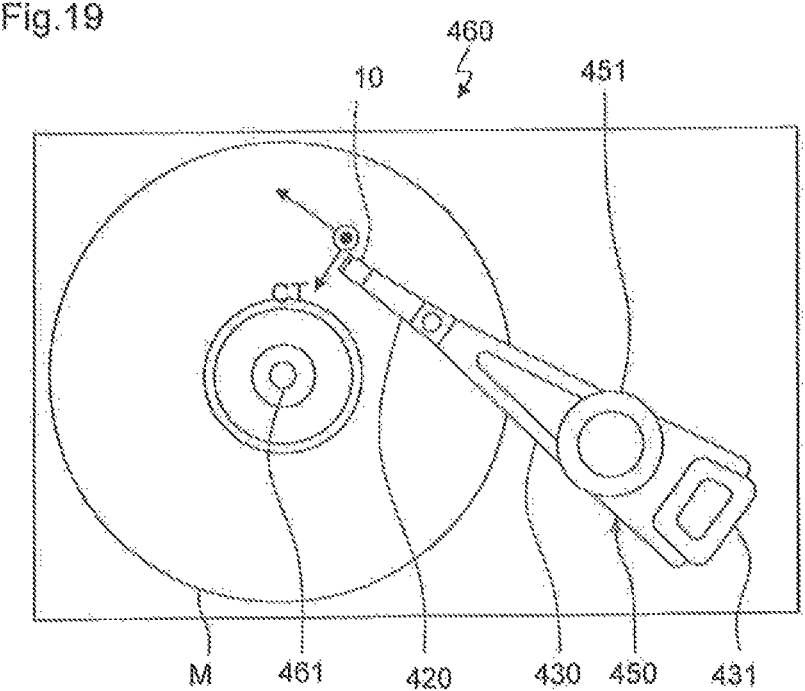
FIG. 19 is a plan view of a magnetic recording apparatus of the present invention.

FIG. 19 is a plan view of a magnetic recording device (HDD). The head stack assembly 450 is incorporated into a magnetic recording device 460. The magnetic recording device 460 has a plurality of magnetic recording media M mounted to a spindle motor 461. Two magnetic head sliders 10 that are opposed across the magnetic recording medium M are arranged in each magnetic recording medium M. The head stack assembly 450 and the actuator except for the magnetic head slider 10 configure a positioning device, support the magnetic head slider 10, and position the magnetic head slider 10 relative to the magnetic recording media M. The magnetic head slider 10 is moved in the cross track direction CT of the magnetic recording media M by the actuator, and is positioned relative to the magnetic recording media M. The magnetic head slider 10 records information into the magnetic recording media M by magnetic recording element(s), and reproduces the information recorded in the magnetic recording media M by the readers (MR elements) of the multi reader head 1.

Although the desirable embodiments of the present invention were presented and explained in detail, it should understood that the invention can be variably modified and altered so long as it does not depart from the intent of the gist or scope of the attached claims.

What is claimed is:

1. A multi reader head, comprising: a plurality of readers laminated via a gap layer, wherein
    each of the readers includes a structure in which a current-perpendicular-to-plane (CPP) type magneto-resistive effect element, where a current flows along a lamination direction, is interposed between a pair of shields that function as an electrode, respectively, from both sides of the CPP type magneto-resistive effect element in the lamination direction,
    a distance between the shields that are opposed to each other via the gap layer of the readers that are adjacent one another in the lamination direction is not constant, but includes a portion with a greater distance between the shields and another portion with a smaller distance between the shields, the portion with a greater distance between the shields is situated farther away from a center on an air bearing surface opposing a recording medium in the magneto-resistive effect element compared to the portion with a smaller distance between the shields.

2. The multi reader head according to claim 1, wherein the portion with a greater distance between the shields is situated at a position that does not overlap with the magneto-resistive effect element.

3. The multi reader head according to claim 1, wherein the gap layer in the portion with a greater distance between the shields is thicker due to an additional insulating layer compared to the gap layer in the portion with a smaller distance between the shields.

4. The multi reader head according to claim 3, wherein the portion with a greater distance between the shields includes:
    one portion which is thicker due to an additional insulating layer compared to the gap layer in the portion with a smaller distance between the shields, and
    another portion which is much thicker due to two additional insulating layers compared to the gap layer in the portion with a smaller distance between the shields.

5. The multi reader head according to claim 3, wherein the insulating layer is made from silicon oxide.

6. The multi reader head according to claim 1, wherein
    a concave portion is formed on an inner surface in the lamination direction of the shield situated at the most outer position in the lamination direction, and
    the concave portion is arranged at a position opposing to the portion with a greater distance between the shields, which are opposed via the gap layer.

7. The multi reader head according to claim 1, wherein three or more readers are laminated via gap layers, respectively.

8. A multi reader head, comprising:
    a plurality of readers laminated via a gap layer, wherein
        each of the readers includes a structure in which a current-perpendicular-to-plane (CPP) type of magneto-resistive effect element, where a current flows in a lamination direction, is interposed between a pair of shields that function as an electrode, respectively, from both sides of the CPP type magneto-resistive effect element in the lamination direction; and
        at least one of the shields that are opposed via the gap layer of the readers that are adjacent in the lamination direction has a portion that is bent or curved away from an opposite one of the shields that are opposed via the gap layer.

9. The multi reader head according to claim 8, wherein each of the shields has a portion that is bent or curved away from the opposite one of the shields, and the portions of the shields that are bent or curved away from the opposite one of the shields are situated at positions away from a portion that interposes the center of an air bearing surface opposing to a recording medium.

10. The multi reader head according to claim 8, wherein each of the shields has a portion that is bent or curved away from the opposite one of the shields, and the portions of the shields that are bent or curved away from the opposite one of the shields are situated at positions that do not overlap with the magneto-resistive effect element.

11. The multi reader head according to claim 8, wherein the portion of the at least one shield that is bent or curved away from the opposite one of the shields is bent or curved along an insulating layer that is partially included in the gap layer, respectively.

12. The multi reader head according to claim 11, wherein the insulating layer is made from silicon oxide.

13. The multi reader head according to claim 8, wherein a concave portion is formed on an inner surface in the lamination direction of the shield situated at the outer most position in the lamination direction, and the concave portion is disposed at a position corresponding to the bent or curved portion of the at least one shield opposing via the gap layer.

14. The multi reader layer according to claim 8, wherein three or more readers are laminated via the gap layer, respectively.

15. A head gimbal assembly, comprising:
   a magnetic head slider that is provided with the multi reader head according to claim 1, and
   a suspension that elastically supports the magnetic head slider, wherein the suspension comprises:
      a flexure where the magnetic head slider is joined,
      a load beam that has one end connected to the flexure, and
      a base plate that is connected to another end of the load beam.

16. A head gimbal assembly, comprising:
   a magnetic head slider that is provided with the multi reader head according to claim 8, and
   a suspension that elastically supports the magnetic head slider, wherein the suspension comprises:
      a flexure where the magnetic head slider is joined,
      a load beam that has one end connected to the flexure, and
      a base plate that is connected to another end of the load beam.

17. A magnetic recording device, comprising:
   a magnetic head slider that is provided with the multi reader head according to claim 1,
   a magnetic recording medium that is situated opposing to the magnetic head slider,
   a spindle motor that rotates and drives the magnetic recording medium, and
   a device that supports the magnetic head slider and that positions the magnetic head slider relative to the magnetic recording medium.

18. A magnetic recording device, comprising:
   a magnetic head slider that is provided with the multi reader head according to claim 8,
   a magnetic recording medium that is situated opposing to the magnetic head slider,
   a spindle motor that rotates and drives the magnetic recording medium, and
   a device that supports the magnetic head slider and that positions the magnetic head slider relative to the magnetic recording medium.

* * * * *